United States Patent [19]
Keester et al.

[11] Patent Number: 5,575,881
[45] Date of Patent: Nov. 19, 1996

[54] FILAMENT WOUND FRAME FOR A GAME RACQUET

[75] Inventors: Louis J. Keester, Lincoln, Nebr.;
David L. Brittingham, Bolingbrook;
David W. Repetto, Park Ridge, both of Ill.

[73] Assignee: Wilson Sporting Goods Co., Chicago, Ill.

[21] Appl. No.: 201,280

[22] Filed: Feb. 24, 1994

[51] Int. Cl.⁶ .......................... A63B 49/10; B65H 81/00
[52] U.S. Cl. ...................... 152/175; 156/169; 156/173; 273/73 F
[58] Field of Search .................... 156/173, 175, 156/169, 172; 273/73 R, 73 F, DIG 23; 242/7.02, 7.21; 139/DIG. 1, 387.8

[56] References Cited

U.S. PATENT DOCUMENTS

| | | | |
|---|---|---|---|
| 1,011,090 | 12/1911 | Subers | 139/387 R |
| 1,024,915 | 4/1912 | Subers . | |
| 3,483,055 | 12/1969 | Eshbaugh . | |
| 3,577,294 | 5/1971 | David | 156/173 |
| 3,892,831 | 7/1975 | Robin et al. | 264/103 |
| 3,998,458 | 12/1976 | Inoue . | |
| 4,061,806 | 12/1977 | Lindler . | |
| 4,070,020 | 1/1978 | Dano . | |
| 4,089,727 | 5/1978 | McLain | 156/350 |
| 4,123,054 | 10/1978 | Septier . | |
| 4,128,963 | 12/1978 | Dano . | |
| 4,135,035 | 1/1979 | Branen . | |
| 4,157,181 | 6/1979 | Cecka . | |
| 4,172,175 | 10/1979 | Pearson . | |
| 4,848,745 | 7/1989 | Bohannan . | |
| 4,871,491 | 10/1989 | McMahon et al. | 264/29.2 |
| 4,892,764 | 1/1990 | Drain . | |
| 4,983,242 | 1/1991 | Reed . | |
| 5,094,883 | 3/1992 | Muzzy et al. | 427/185 |
| 5,176,868 | 1/1993 | Davis . | |

FOREIGN PATENT DOCUMENTS

| | | |
|---|---|---|
| 170178 | 5/1986 | European Pat. Off. . |
| 470896A2 | 2/1991 | European Pat. Off. . |
| 2030036 | 8/1969 | France . |
| 2568171 | 7/1984 | France . |
| 2581319 | 2/1985 | France . |
| 2670152 | 5/1990 | France . |
| 2670154 | 5/1990 | France . |
| 2665665 | 8/1990 | France . |
| 2671756 | 1/1991 | France . |
| 2673570 | 8/1991 | France . |
| 1596658 | 12/1971 | Germany . |
| 2736125 | 7/1979 | Germany . |
| 3039140 | 10/1980 | Germany . |
| 52-123731 | 1/1976 | Japan . |
| 5426861 | 1/1977 | Japan . |
| 61-220828 | 1/1986 | Japan . |
| 81107875 | 8/1992 | Taiwan . |

OTHER PUBLICATIONS

Rosato & Grove, "Filament Winding: its development, manufacture, applications & design", 1964.
Processing and Fabrication Technology, pp. 193–204 (1990).
Filament Winding, pp. 2–7 (1966).
Filament Winding Composite Structure Fabrication, pp. 3–4 through 3–7 (1991).

*Primary Examiner*—Michael W. Ball
*Assistant Examiner*—Sam Chuan Yao

[57] ABSTRACT

A frame for a game racquet such as a tennis racquet is formed by interspersed winding of filament material over an elongated mandrel to form a tube. The tube is formed from a wound laminate in which some or all of the circuits of the wind patterns are sequenced in an arbitrary manner by the designer. Each circuit is helically wound along a rotating mandrel. The formed tube is placed in a mold having the shape of the frame, auxiliary pieces for handle and yoke sections are added, and together molded to form the frame.

21 Claims, 6 Drawing Sheets

$+\alpha_1 \quad +\alpha_2 \quad +\alpha_3 \quad +\alpha_4 \quad +\alpha_5 \quad +\alpha_6 \quad -\alpha_5 \quad -\alpha_4 \quad -\alpha_3 \quad -\alpha_2 \quad -\alpha_1$
$-\alpha_6$

FILAMENT WOUND FRAME FOR A GAME RACQUET

BACKGROUND

This invention relates to a filament wound frame for a game racquet such as a tennis racquet, racquetball racquet, squash racquet, badminton racquet, etc. More particularly, the invention relates to a game racquet frame which is formed by interspersed winding.

Filament winding is a well known process for forming products from filament material such as graphite fiber, glass fiber, etc. In the filament winding process, filament material is wound around a rotating mandrel to form a tube. The filament material can be in the form of a tow, which is formed from a plurality of filaments or continuous fibers, for example, with carbon 3000, 6000, or 12000 filaments per tow. Fewer or more filaments per tow can be used for carbon as well as other fibers, for example, from one to 50,000.

The filament material is coated with resin before or after winding. The wound tube is placed in a mold having the shape of the end product, and the mold is heated to cure the resin.

Filament wound parts are normally manufactured by winding discrete layers of material on a mandrel, using a helical or geodesic path. Each layer is made up of a 2-ply balanced laminate formed from a multicircuit winding pattern. The number of circuits required for each layer is calculated from the bandwidth of the material and the wind angle, so that the pattern closes and a constant thickness is achieved in the layer. Different layers may be wound at different angles, but each layer typically consists of a $+\alpha°$ angle ply and a $-\alpha°$ angle ply with respect to the longitudinal axis of the rotating mandrel, resulting from the reciprocating traverse of the carriage in the winding machine.

Conventional filament winding produces discrete layers or lamina of fibers. The layers have a tendency to move relative to each other when the wound article is stressed, during removal from the mandrel and loading of the wound tube in the mold. Also, the physical properties of the article are often limited by the shear properties between layers, called interlaminar shear.

Tennis racquets have been produced by conventional filament winding. For example, EPO patent publication No. 0 470 896 describes forming a frame for a tennis racquet by winding fibers of glass, carbon, or other materials.

The following definitions are used herein:

CIRCUIT: One complete traverse of the fiber feed mechanism of a filament winding machine.

INTERSPERSE: To sequence wind circuits from two or more patterns in an arbitrary manner as selected by the designer. Each circuit is appied individually such that any combination and sequence of wind angles from the patterns may by applied. No discrete layers or lamina exist.

TOW: Untwisted bundle of continuous filaments

PLY: A single pass on a filament winding machine in which fiber is applied in one direction to the axis of the mandrel.

A LAYER is typically formed from a series of winding circuits resulting in a closed pattern of 2-plies; one of $+\alpha°$ and the other of $-\alpha°$.

LAMINA: A single ply or layer in a laminate made up of a series of layers.

SUMMARY OF THE INVENTION

The invention uses an interspersed winding method to form a tube for making a frame for a game racquet. When a part is wound by the interspersed winding method, the concept of discrete layers does not apply. Each circuit is applied to the mandrel individually such that any combination and sequence of wind angles may be applied. Adjacent circuits or winds are separated longitudinally along the mandrel. This process may, but does not necessarily, apply a complete series of circuits such that any wind angle eventually covers the entire surface area of the part. The sequence of winding circuits of different wind angles is arbitrary as selected by the designer. This arbitrary sequencing or interspersion of circuits results in a three dimensional interlocking of the fibers. No discrete layers or lamina exist. The interspersed winding method provides a significant amount of interlocking fiber to maintain preform integrity during handling and reduces the tendency of the laminate to fail in interlaminar shear. In addition, an increase in the stiffness of the preform as well as the molded laminate results from winding of filaments with the interspersed method.

The filament tow can be wetted with resin before winding, called wet-winding, or be wound dry and the wound tube can be impregnated with resin. Also, the filament tow can be in the form of towpreg, in which the filaments in the tow have been previously impregnated with resin. The tube is molded to form a racquet frame in the conventional manner.

DESCRIPTION OF THE DRAWINGS

The drawings will be explained in conjunction with the illustrative embodiments shown in the accompanying drawings, in which.

DESCRIPTION OF SPECIFIC EMBODIMENT

Figure 1:
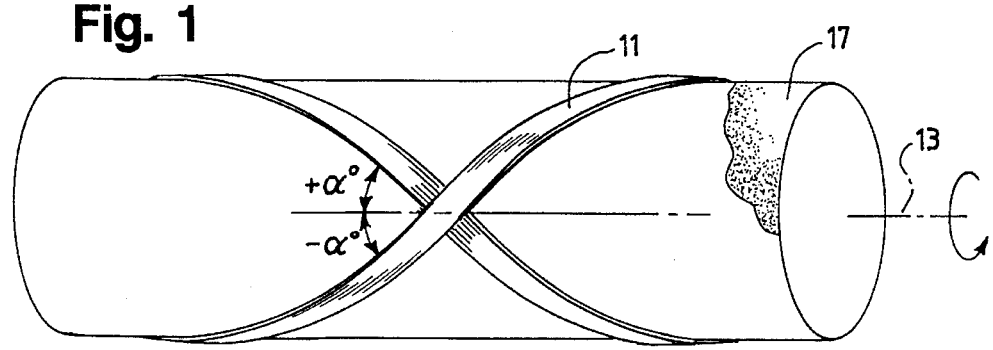
FIG. 1 is a schematic illustration of a helical-wound filament around a mandrel.

FIG. 1 illustrates a helical-wound filament in which tows 11 are wound over a rotating mandrel 12 covered by an inflatable tubular plastic bladder 17. Filament winding machines are well known and need not be described herein. Such winding machines conventionally include a rotatory driven, elongated mandrel and a filament-feeding carriage which is mounted for longitudinal movement back and forth along the length of the mandrel. The winding machine carriage moves along the mandrel in one direction to lay down a filament tow in a constant angle helical path, or geodesic path, and then moves in an opposite direction to lay down the filament at an angle negative to the previous pass. In conventional multicircuit winding, after the first circuit is completed, the applied filaments are not adjacent and additional circuits must be traversed before the pattern begins to lay filaments adjacent to each other. This helical path is continued for the number of circuits required to close the pattern in both directions of filament traverse. Once this initial pattern becomes closed and the initial layer is completed, then additional layers are wound in a similar manner as selected by the designer.

Figure 2:
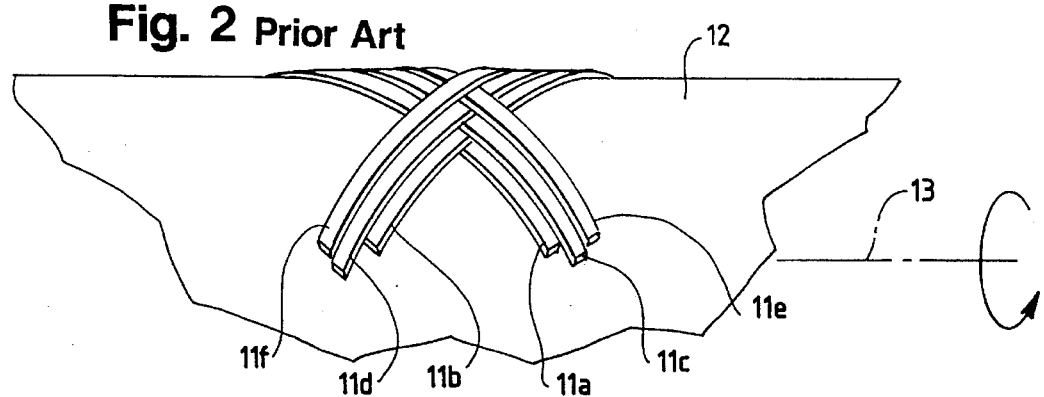
FIG. 2 is a schematic illustration of conventional filament winding.

In FIG. 2 the first circuit of filament material is indicated by the tow 11a which extends at an angle, typically between + near 0° to +45°, to the longitudinal axis 13 of the mandrel. The second circuit of filament material is wound in the opposite direction and is indicated by tow 11b which extends at an angle of minus near 0° to −45° to the axis of the mandrel. Succeeding circuits of filament material, indicated by the tows 11c, 11d, 11e, 11f, etc., are wound in a similar manner until the pattern is closed. These windings form the first and second plies, or the inital layer around the mandrel. Once the pattern is closed with these first and second plies, this initial layer is followed by succeeding layers in a similar manner, until the laminate, consisting of various layers of wound filaments is complete.

Figure 3:
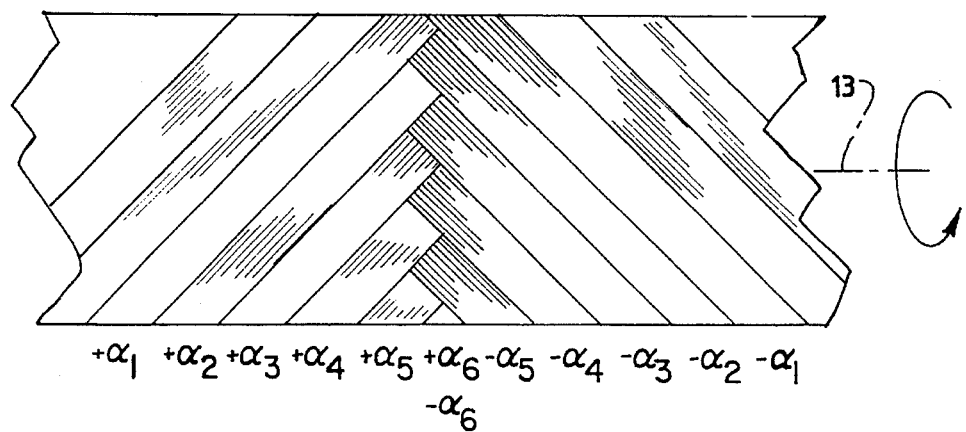
FIG. 3 is a schematic illustration of a conventional helical wind pattern showing the first of three layers of filaments, the first layer (2-plies) consisting of $+\alpha°$ and $-\alpha°$ angle winds.
Figure 3A:
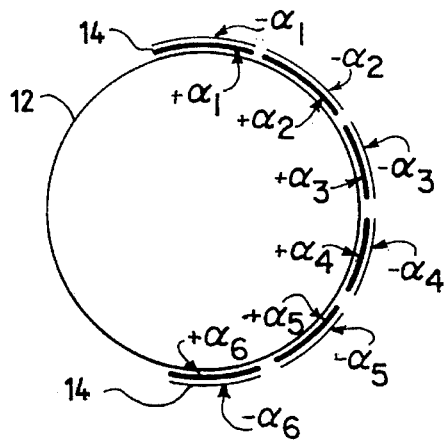
FIG. 3a is a cross-sectional view of the first layer of half the mandrel.

FIGS. 3 and 3a illustrate the initial layer of a conventional helical winding pattern in which both the positive angle ply and the negative angle ply, relative to the centerline 13 of the winding mandrel, are closed. In this example, we assume that the winding angle $\alpha$ is 45° and the diameter of the mandrel is such that a total of 9 circuits have been calculated to close the pattern. A one-half cross-sectional view of the mandrel 12 is given showing the two ±45° angle plies of filaments. The length of the arc 14 formed by both the +α° and −α° wind angles is based on the bandwidth and wind angle of the filament.

Figure 3B:
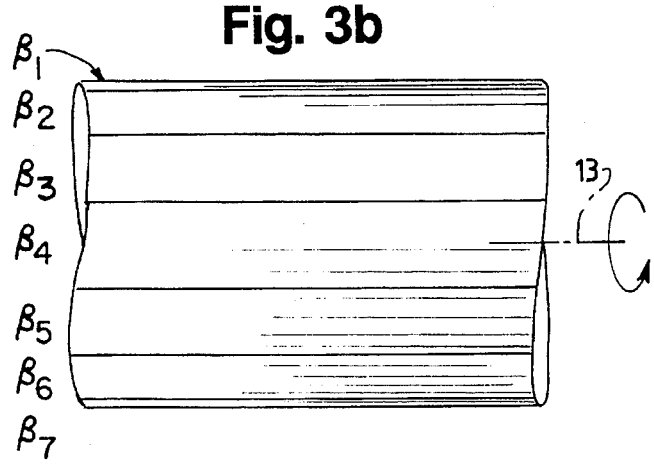
FIG. 3b is a schematic illustration of the middle layer of 0° wind angle filaments.
Figure 3C:
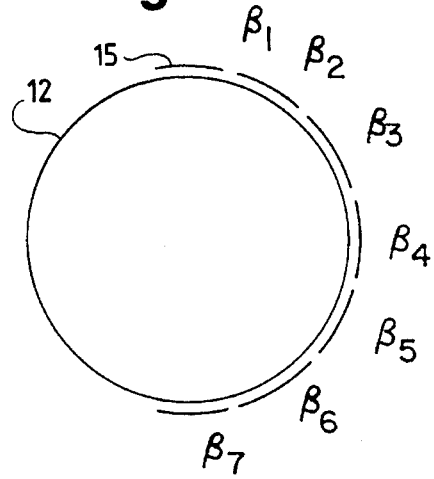
FIG. 3c is a cross-sectional view of the middle layer.

FIGS. 3b and 3c illustrates the middle layer of a conventional winding pattern where the wind angle $\beta$ is 0°, or parallel, to centerline 13 of the mandrel 12. A one-half cross-sectional view of the mandrel 12 is given showing in this example a total of 12 circuits needed to close this 0° wind pattern. The length of the arc 15 will be equal to the width of the filament.

Figure 3D:
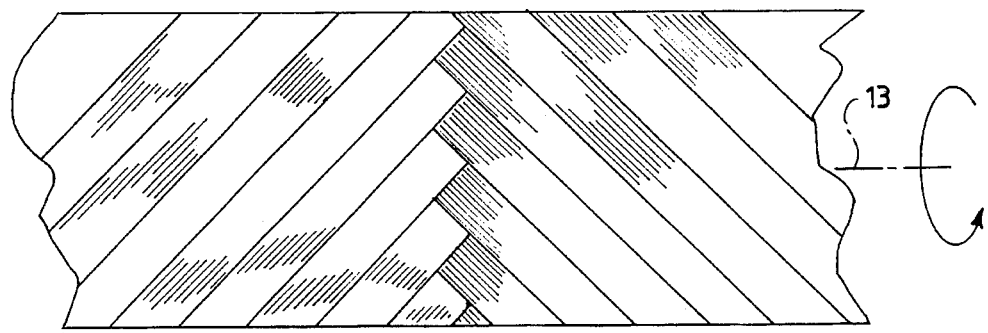
FIG. 3d is a schematic illustration of a conventional helical wind pattern showing the third layer of filaments.

FIG. 3d illustrates the third layer of this laminate structure where the wind angle $\gamma$ to the centerline 13 of the mandrel is applied to the mandrel in both positive and negative angle plies, as in FIG. 3. In this example, we have selected $\gamma$ to be equal to 45°, and thus needs 9 circuits to close the pattern.

Figure 3E:
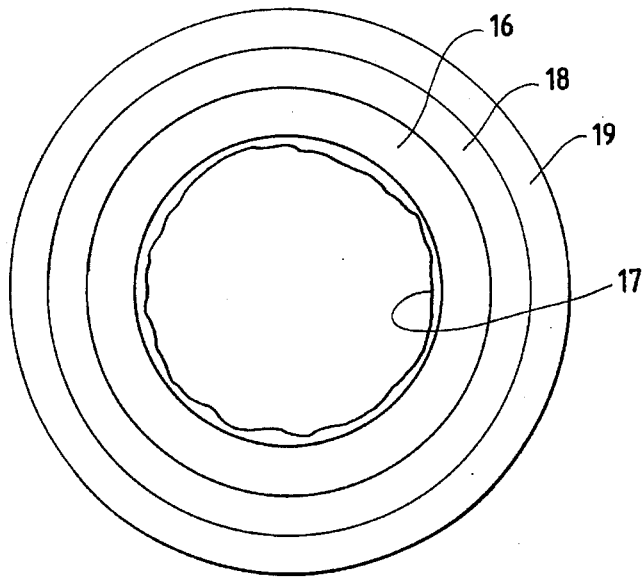
FIG. 3e is a cross-sectional view of all three closed pattern layers.

In FIG. 3e, a cross-sectional view of the completed laminate is illustrated consisting of the inflatable bladder, the 1st layer of wound filament 16 wound at angle ±α°; the 2nd layer of wound filament 18 wound at angle ±β°; and the 3rd layer of wound filament 19 wound at angle ±γ°.

The filaments may be prewet with resin before winding on the mandrel, or the filaments can be coated with resin after winding. The wound filament tube is then shaped into a racquet preform and inserted into a mold; heated to cure the resin and form a rigid, fiber reinforced frame. It is common in racquet fabrication to insert reinforcement plies of both 0° and/or 90° fiber cut pieces between the layers of filaments at various locations in the hoop and handle areas of the frame.

Figure 4:
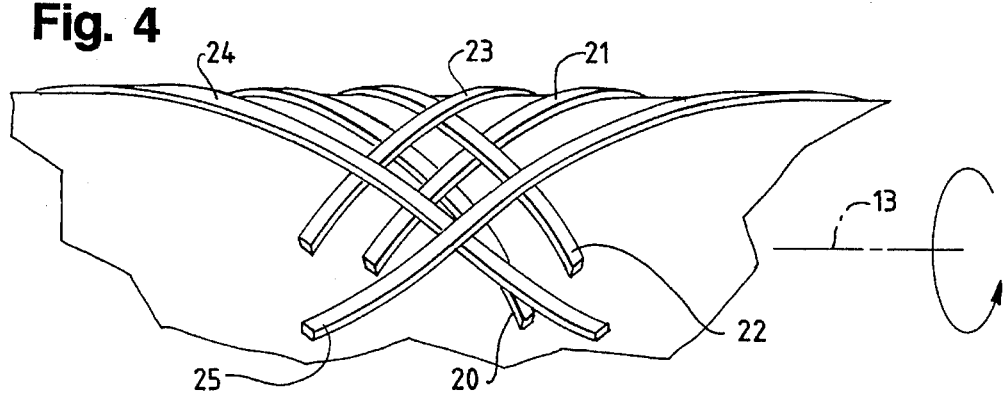
FIG. 4 is a schematic illustration of an interspersed winding method.

FIG. 4 illustrates a method of interspersed filament winding for forming a frame for a game racquet. The invention will be explained in conjunction with a frame for a tennis racquet, but the invention can be used to form frames for other types of game racquets such as racquetball racquets, squash racquets, badminton racquets, etc.

As in FIG. 1, a conventional rotatable driven mandrel 12 is covered by an inflatable tubular plastic bladder 17. In an example of interspersed winding, the first circuit of filament material is indicated by tow 20, wound at an angle of +α° to the longitudinal axis of the rotating mandrel, and tow 21, wound at an angle of −α° to the mandrel axis. In the next circuit, tow 22 is also wound at +α° and tow 23 is wound at −α°. The next circuit selected by the designer would be from a different wind pattern. Tow 24 is wound at +β° and tow 25 at −β°. The angles of successive circuits are arbitrary and contain circuits from some or all of the patterns selected by the designer.

Figure 5:
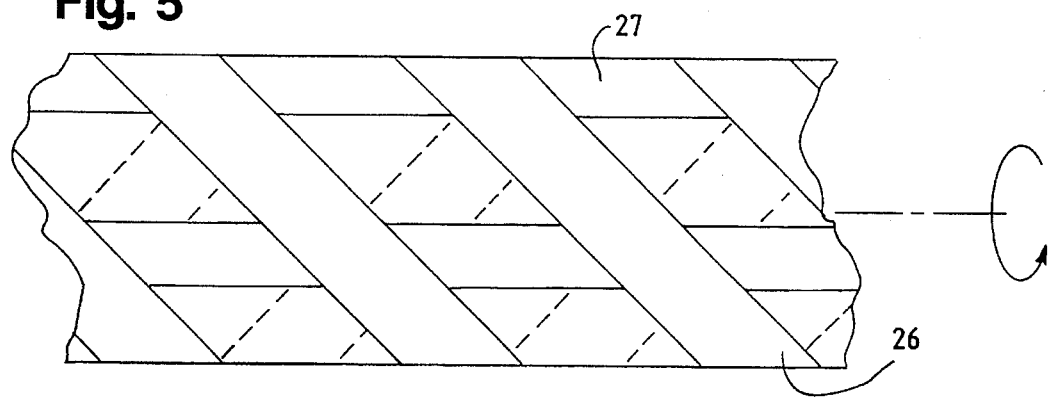
FIG. 5 is a schematic illustration of an interspersed winding pattern showing only the initial few circuits for clarity.
Figure 5A:
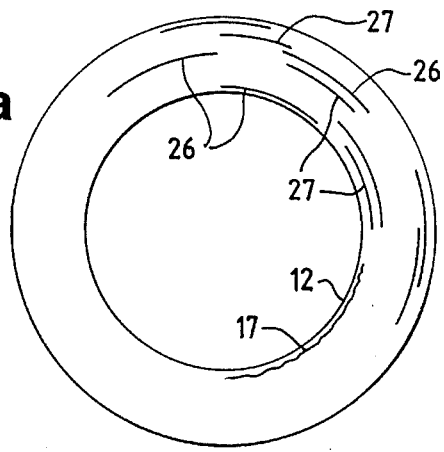
FIG. 5a is a cross-sectional view of the pattern of FIG. 5.

FIGS. 5 and 5a illustrate an example of a interspersed wound laminate that consists of a combination of ±45° and 0° filaments. In this pattern, 16 circuits of ±45° filaments are required to achieve a closed pattern and 12 circuits of 0° filaments to close. The designer has chosen to intersperse the circuits in such a manner to alternate these two patterns after every four circuits. In FIG. 5a, the resulting laminate cross-section shows the position of the ±45° bands 26 and the 0° bands 27.

Figure 6A:
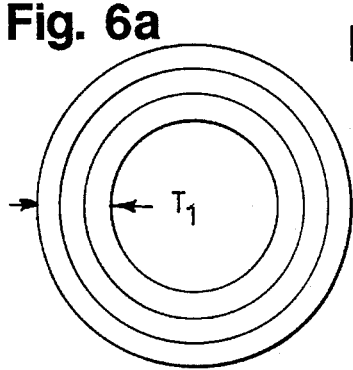
FIG. 6a is a cross-sectional view of a conventional wind pattern of 3 layers of filaments.
Figure 6B:
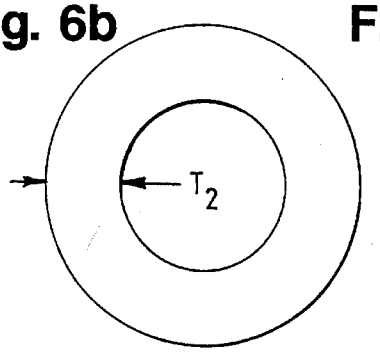
FIG. 6b is a cross-sectional view of an interspersed wind pattern to form the laminate.
Figure 6C:
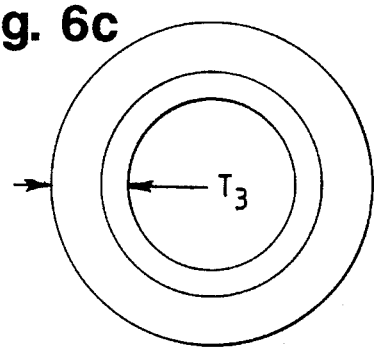
FIG. 6c is a cross-sectional view of a combination design consisting of a conventional wound inner layer, covered by interspersed wound circuits.

FIGS. 6a through 6c illustrate a cross-sectional view showing three possible patterns that would be applicable in filament winding of game racquets. In FIG. 6a, a conventional wound tube is given with the laminate thickness of $t^1$. This prior art wound tube has three layers, as discussed in FIG. 3. In FIG. 6b, a wound tube consisting of a series of circuits wound with an interspersed pattern, as discussed in FIG. 5, is given with the laminate thickness of $t^2$. In order to provide additional strength for the string holes which will be drilled in the completed frame, it may be desirable to form a completely closed inner or outer layer, or both, of filaments wound in a conventional manner. In FIG. 6c, a combination design is presented of an inner layer formed by a conventional helical wind followed by a series of circuits wound using an interspersion of two patterns with a resulting laminate thickness of $t^3$. In order to control the final weight of the preform laminate the total thickness 28 would be the same for each option, that is $t^1=t^2=t^3$.

Figure 7:
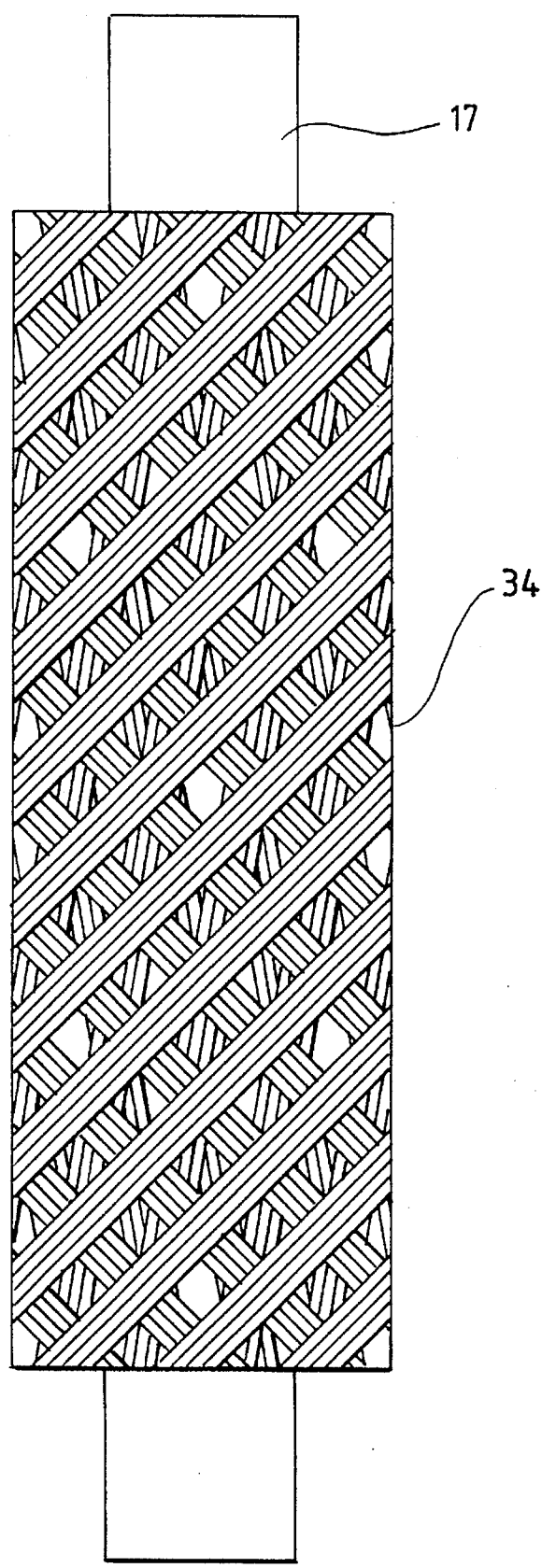
FIG. 7 illustrates the wound tube during the placement of the initial circuits of material.
Figure 8:
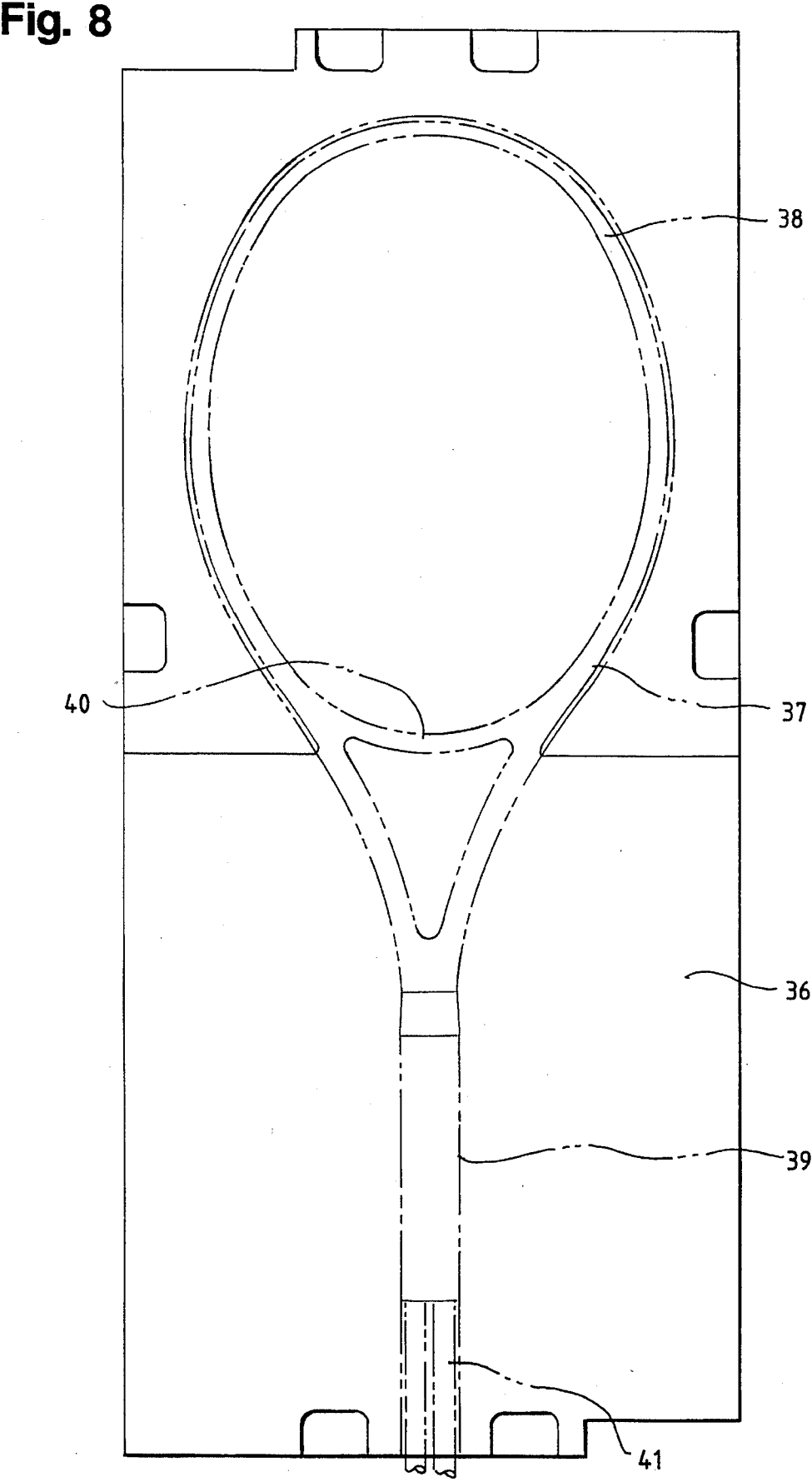
FIG. 8 is a plan view of a mold for a tennis racquet frame.

Referring to FIGS. 7 and 8, the wound tube 34 and the bladder 17, inside the tube, are removed from the mandrel and placed in a mold 36 which has a mold cavity 37 in the shape of a frame for a tennis racquet. Alternatively, the tube can be wound directly on the mandrel without a bladder, and the bladder can be inserted into the tube after the tube is removed from the mandrel. The mold cavity 37 includes a hoop-shaped head portion 38 and a handle portion 39 in which both ends of the wound tube are positioned. A separate yoke piece (not shown) is inserted into the yoke portion 40 of the cavity and connected to the adjacent portions of the wound tube.

The ends of the bladder extend outside of the mold and are connected to a pressure manifold 41 in accordance with conventional racquet molding technique. The mold is closed and heated while the wound tube is forced against the surface of the mold cavity by pressurizing the bladder.

The tows which are used to form the wound tube are preferably formed from graphite fibers. However, other fibers can also be used, either alone or in combination, such as glass, aramid, boron, polynieric, etc. to form a hybrid wind.

The arbitrary interspersion of wound circuits provided by the interspersed winding technique results in a three dimensional interlocking of the fibers. The interlocked fibers maintain the structural integrity of the wound tube after the tube is removed from the mandrel, particularly if the tube is formed from dry fiber which are not prewet with resin. The interlocked fibers also reduce the tendency of the tube to fail in the interlaminar shear mode because no discrete layers exist. Additionally, this interlocking of continuous fibers increases the stiffness of the molded game racquet.

Figure 9:
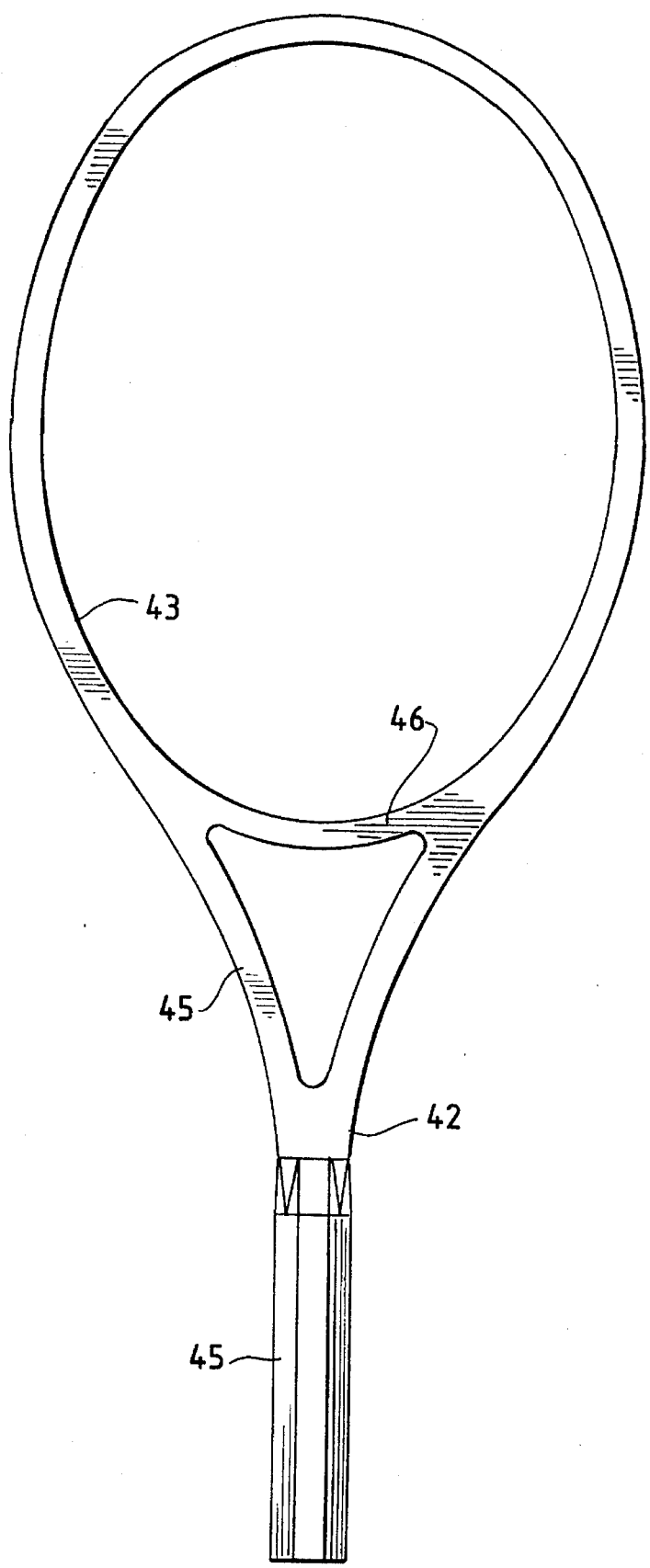
FIG. 9 is a front elevation view of a tennis racquet frame.

FIG. 9 illustrates the molded racquet frame 42 after it is removed from the mold. The frame includes a head portion 43, a handle portion 44, a throat portion 45, and a yoke 46. The racquet is completed in the conventional manner by drilling string holes in the head and yoke, wrapping a grip around the handle, and stringing the head.

Alternatively, all or a portion of the wound tube can be wrapped with one or more layers of unidirectional prepreg before molding.

The winding angle can also be changed at a selected position along the mandrel to achieve selected properties of the racquet laminate.

While in the foregoing specification, a detailed description of a specific embodiment of the invention was set forth for the purpose of illustration, it will be understood that many of the details herein given may be varied considerably by those skilled in the art without departing from the spirit and scope of the invention.

I claim:

1. In a method of making a frame for a game racquet in which filament material is helically wound over a portion of an elongated rotating mandrel to form a tube, the filament material being fed from a carriage which moves back and forth in opposite directions parallel to the longitudinal axis of the mandrel, the steps of:

helically winding a first set of circuits of filament material, the circuits of the first set being wound at plus a first angle relative to the longitudinal axis of the mandrel by moving the carriage in one direction and at minus the first angle relative to the longitudinal axis of the mandrel by moving the carriage in the opposite direction and the number of circuits in the first set being less than the number of circuits which is required to form a closed pattern at said first angle, helically winding a second set of circuits of filament material over the first set of circuits, the circuits of the second set being wound at plus a second angle relative to the longitudinal axis of the mandrel which is different than the first angle by moving the carriage in one direction and at minus the second angle relative to the longitudinal axis of the mandrel by moving the carriage in the opposite direction and the number of circuits in the second set being less than the number of circuits which is required to form a closed pattern at said second angle, helically winding a third set of circuits of filament material over the second set of circuits, the circuits of the third set being wound at plus a third angle relative to the longitudinal axis of the mandrel which is different than the second angle by moving the carriage in one direction and at minus the third angle relative to the longitudinal axis of the mandrel by moving the carriage in the opposite direction and the number of circuits in the third set being less than the number of circuits which is required to form a closed pattern at said third angle, continuing to wind circuits of filament material by moving the carriage back and forth until said portion of the mandrel is covered by the filament material, removing the tube from the mandrel, placing the tube in a mold having the shape of a frame of a game racquet, and molding the tube into the shape of a frame of a game racquet.

2. The method of claim 1 in which the first and third angles are the same.

3. The method of claim 1 in which the first and third angles are different.

4. The method of claim 1 including helically winding a fourth set of circuits of filament material over the third set of circuits, the circuits of the fourth set being wound at ± a fourth angle which is different than the third angle and the number of circuits in the fourth set being less than the number of circuits which is required to form a closed pattern at said fourth angle.

5. The method of claim 4 in which the first and third angles are the same.

6. The method of claim 5 in which the second and fourth angles are the same.

7. The method of claim 4 in which the first and third angles are different.

8. The method of claim 7 in which the second and fourth angles are different.

9. The method of claim 1 in which adjacent circuits of the first set are separated longitudinally along the mandrel.

10. The method of claim 9 in which adjacent circuits of the second set are separated longitudinally along the mandrel.

11. The method of claim 10 in which adjacent circuits of the third set are separated longitudinally along the mandrel.

12. The method of claim 1 in which, before the step of winding said first set of circuits, a layer of filament material is helically wound, the layer comprising a plurality of circuits of filament material wound at ± the same angle until the pattern formed by the circuits is substantially closed.

13. The method of claim 12 in which, before removing the tube from the mandrel, a layer of filament material is helically wound, the layer comprising a plurality of circuits of filament material wound at ± the same angle until the pattern formed by the circuits is substantially closed.

14. The method of claim 1 in which before removing the tube from the mandrel, a layer of filament material is helically wound, the layer comprising a plurality of circuits of filament material wound at ± the same angle until the pattern formed by the circuits is substantially closed.

15. The method of claim 1 in which the first angle varies along the length of the mandrel.

16. The method of claim 1 in which the second angle varies along the length of the mandrel.

17. The method of claim 1 in which the third angle varies along the length of the mandrel.

18. The method of claim 1 including the step of adding reinforcement pieces to the tube at selective locations to improve the properties of the molded racquet.

19. The method of claim 1 in which the filament material includes graphite and one or more materials selected from glass, aramid, boron, and polymeric.

20. The method of claim 1 in which the filament material is coated with resin before being wound on the mandrel.

21. The method of claim 1 in which the filament material is wound on the mandrel in a dry state without resin and the wound tube is impregnated with resin.

* * * * *